(No Model.)  F. F. RAYMOND, 2d.  8 Sheets—Sheet 1.
HEEL NAILING AND COMPRESSING MACHINE.
No. 570,437. Patented Oct. 27, 1896.

(No Model.)

F. F. RAYMOND, 2d.
HEEL NAILING AND COMPRESSING MACHINE.

No. 570,437.  Patented Oct. 27, 1896.

WITNESSES  INVENTOR (No Model.)  F. F. RAYMOND, 2d.  8 Sheets—Sheet 6.
HEEL NAILING AND COMPRESSING MACHINE.

No. 570,437.  Patented Oct. 27, 1896.

WITNESSES.
J. M. Dolan.
Stephen Thacher

INVENTOR.
F. F. Raymond (No Model.) 8 Sheets—Sheet 7.

F. F. RAYMOND, 2d.
HEEL NAILING AND COMPRESSING MACHINE.

No. 570,437. Patented Oct. 27, 1896.

Fig. 7.

WITNESSES. INVENTOR.

UNITED STATES PATENT OFFICE.

FREEBORN F. RAYMOND, 2D, OF NEWTON, MASSACHUSETTS, ASSIGNOR TO JAMES W. BROOKS, OF PETERSHAM, AND JOHN BROOKS, OF CAMBRIDGE, MASSACHUSETTS, TRUSTEES.

HEEL NAILING AND COMPRESSING MACHINE.

SPECIFICATION forming part of Letters Patent No. 570,437, dated October 27, 1896.

Application filed February 4, 1890. Serial No. 339,167. (No model.)

*To all whom it may concern:*

Be it known that I, FREEBORN F. RAYMOND, 2d, a citizen of the United States, residing at Newton, in the county of Middlesex and State of Massachusetts, have invented a new and useful Improvement in Heel Nailing and Compressing Machines and Method of Compressing, Pricking, and Loading Heels, of which the following is a full, clear, and exact description, reference being had to the accompanying drawings, forming a part of this specification, in explaining its nature.

The invention relates to an organized machine for attaching heel-blanks, or for loading heel-blanks, or for loading and compressing heel-blanks, and the method which it illustrates, embodying an arrangement of operative devices whereby the compression of the heel-blank, the pricking or formation of holes therein, and the feeding of nails to the blank and the driving of the nails into the blank are done at one reciprocation of the cross-head. This result is accomplished by moving the heel toward the templet or compressing-die and templet by the former or support compressing the heel-blank and molding it, if a die be used, and then immediately driving the awls into the heel-blank from its heel-seat end through the blank to or into the holes of the templet, then retracting the awls, feeding the nails through the holes of the templet at the tread end, and immediately driving the nails into the heel-blank from the tread end.

In the drawings, Fig. 9 is a view principally in vertical section from front to rear of the machine to illustrate a slight modification in the method of operating the nail-carrier, to which reference is hereinafter made.

A is the frame of the machine.

B is the upper cross-head. Upon it is mounted a block $b$, carrying a gang of drivers $b'$.

C is a solid die having the die-cavity $c$.

$c'$ is a templet-plate having holes $c^2$. The templet-plate and die are held in recesses $c^3$ in the extensions $a$ of the frame. The die is closed at its upper end by the templet, and the opening thereto faces downward.

Figure 3:
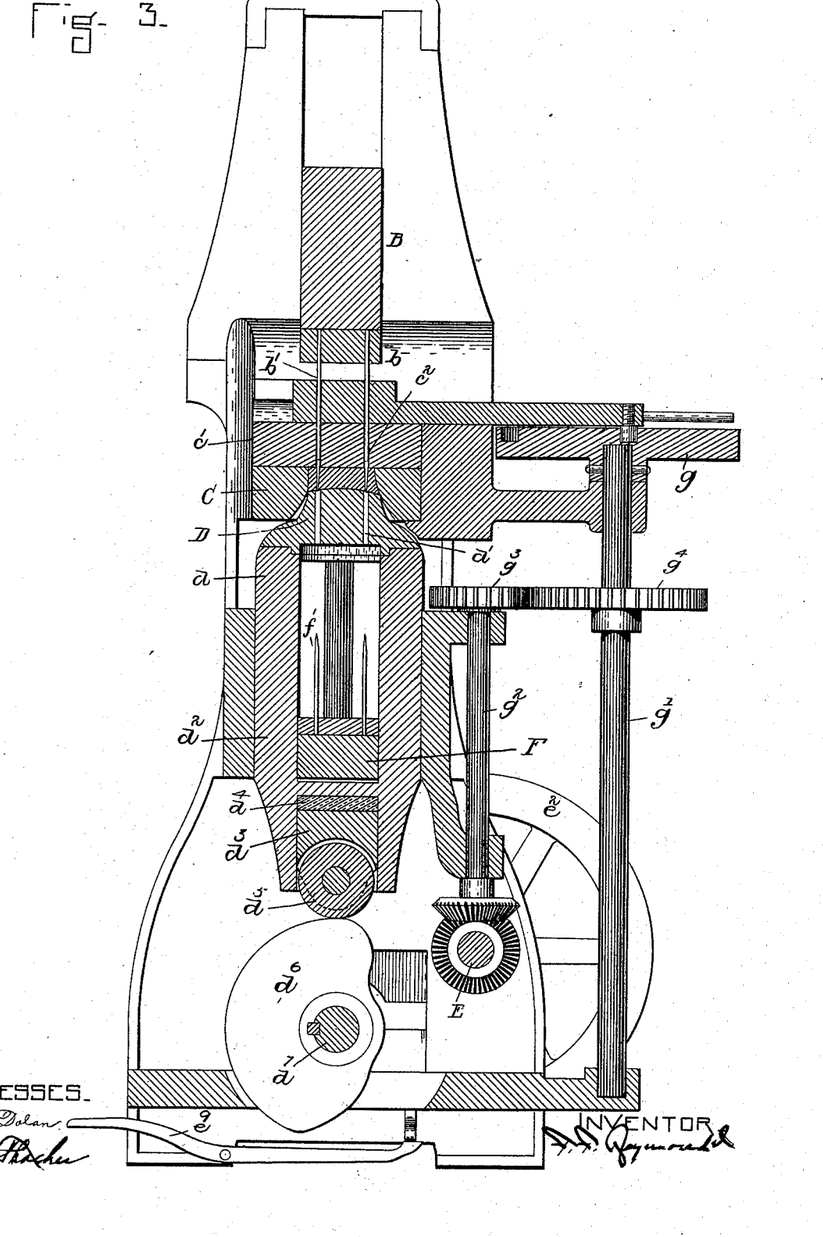
Fig. 3 is a view in vertical central section thereof from front to rear.
Figure 4:
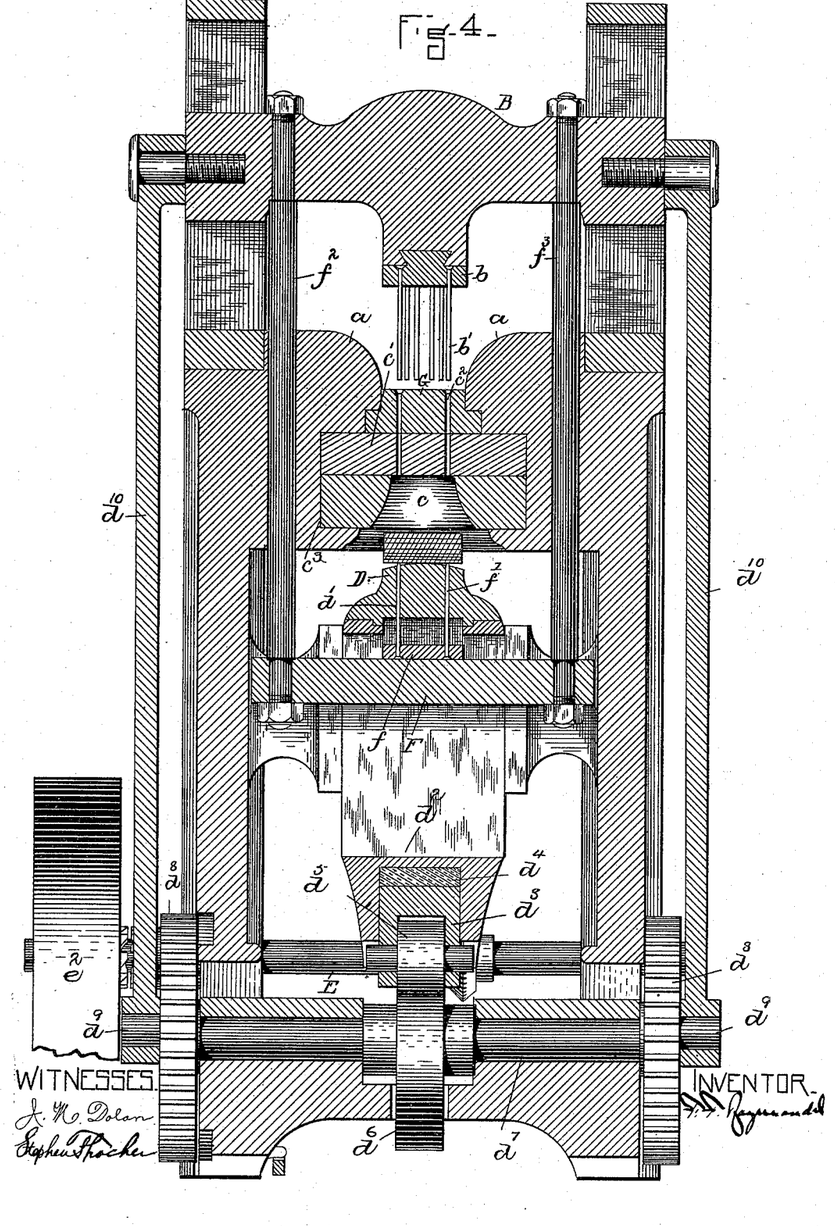
Fig. 4 is a view in section thereof from side to side of the machine.

In Fig. 3, D is a heel-former. It is mounted or attached to a pressure-head $d$, and it is provided with the holes $d'$. The pressure-head is in two parts $d^2 d^3$, and between the parts is interposed a block of rubber $d^4$. The lower part $d^3$ bears an antifriction-roll $d^5$, which rests upon the pressure-cam $d^6$. This cam is shaped to immediately move the former with the heel-blank thereon upward upon the starting of the machine, forcing the heel-blank into the cavity of the die and against the under surface of the templet and holding the heel-blank in this position during the reciprocation of the awls and of the drivers, as hereinafter indicated. There may be a slight release on the part of the cam after the first compression, but only a slight one. The cam $d^6$ is mounted upon the shaft $d^7$. This shaft in Fig. 4 is represented as having at each end a gear $d^8$, bearing a crank-pin $d^9$, and the crank-pins are connected with the cross-head B by the connecting-rods $d^{10}$. The shaft $d^7$ is driven from the power-shaft E. This shaft has pinions $e\,e'$, which mesh with the gears $d^8$ on the shaft $d^7$. It also carries the large driving balance-wheel $e^2$, which has one member $e^3$ of a clutch on its hub. The other member of the clutch $e^4$ is moved upon the shaft E into and out of engagement with the member $e^3$ by means of a lever $e^5$, which is pivoted at $e^6$, and by means of a forked end and rolls engages the movable member $e^4$ of the clutch. This lever has a latch $e^7$, which is held in line with a cam-stop $e^8$ on the inner face of the gear $d^8$, and is adapted to be moved out of engagement with said cam-stop by means of a treadle $e^9$ and suitable connection. Upon the disengagement of the latch the spring $e^{10}$ moves the lever $e^5$ and the movable member $e^4$ of the clutch into engagement with the driving member of the clutch, and said engagement is maintained until the gear $d^8$, making a full revolution, comes into contact with the latch, which meanwhile is moved into position to be operated by it to draw the lever and the movable member of the clutch away from the driven member of the clutch and in opposition to the actuating-spring. In the section $d^2$ of the pressure-head there is arranged a cross-head F, which has a movement in the section $d^2$ independent of it, and which carries or supports a block $f$, from which extends upwardly, to enter the holes $d'$, the gang of awls $f'$. This cross-head F is connected with the upper cross-head B by the connecting-rods $f^2 f^3$, (see Fig. 4,) so that it moves in unison with the cross-head B.

G is the nail-carrier. It is moved into and out of operative position positively and automatically in any desired way, and in Figs. 1, 2, and 5, I have shown it as operated or moved into a position by means of a cam $g$ upon a vertical shaft $g'$. This shaft is operated from the power-shaft by means of a bevel-gear connection between it and the short vertical shaft $g^2$ and a small gear $g^3$ upon the upper end of this short shaft, which engages with the larger gear $g^4$ upon the vertical shaft $g'$.

In Fig. 9, I have represented the nail-carrier as moved into position by means of a lever G', pivoted at $g^5$ and operated by a cam $g^6$ on a horizontal shaft $g^7$, connected by a gear with one of the gears upon the shaft $d^7$. In both cases I have represented the cam $g$ and $g^6$ as constructed to move the nail-carrier into operative position. The nail-carrier is moved out of operative position by means of springs $g^8$.

Figure 1:
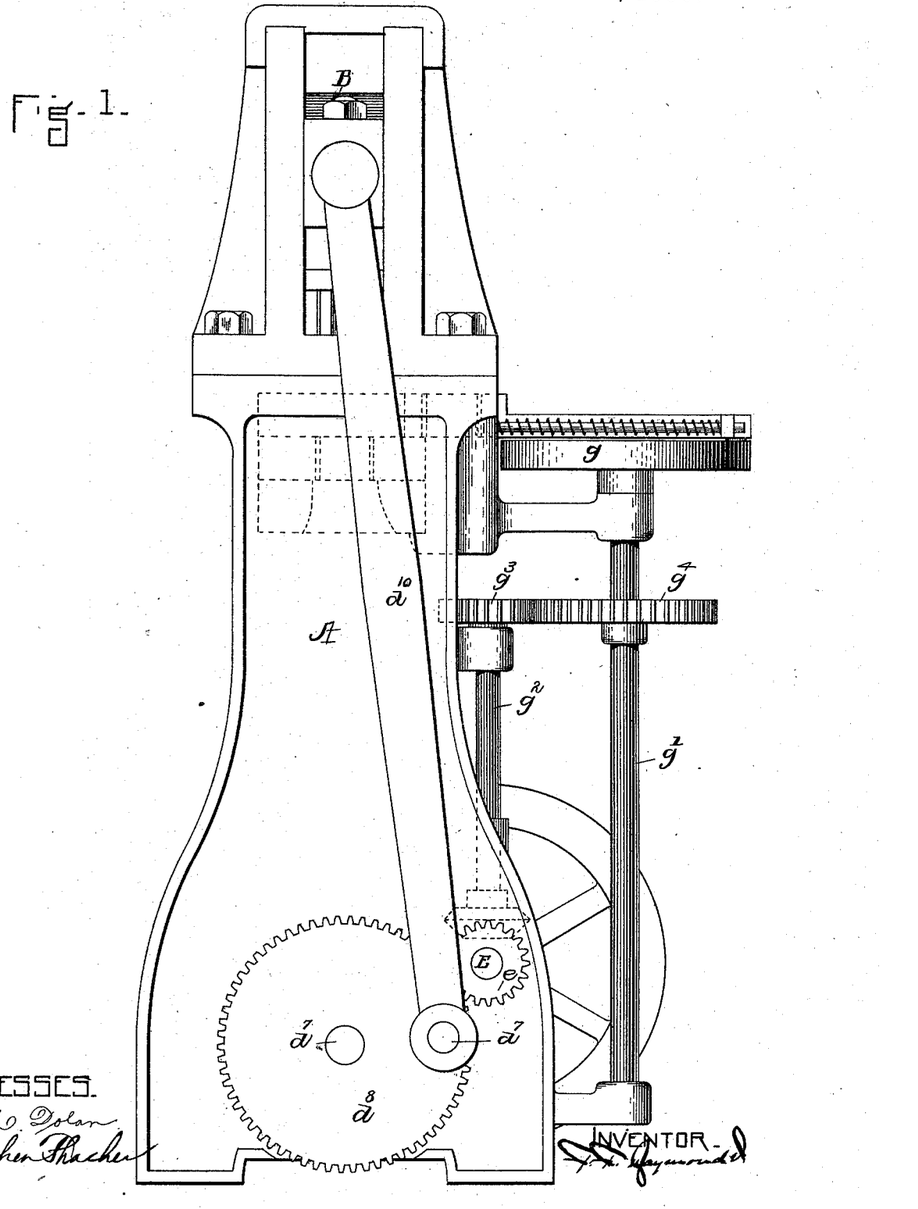
Figure 1 is a view in side elevation of a machine having the features of my invention.
Figure 2:
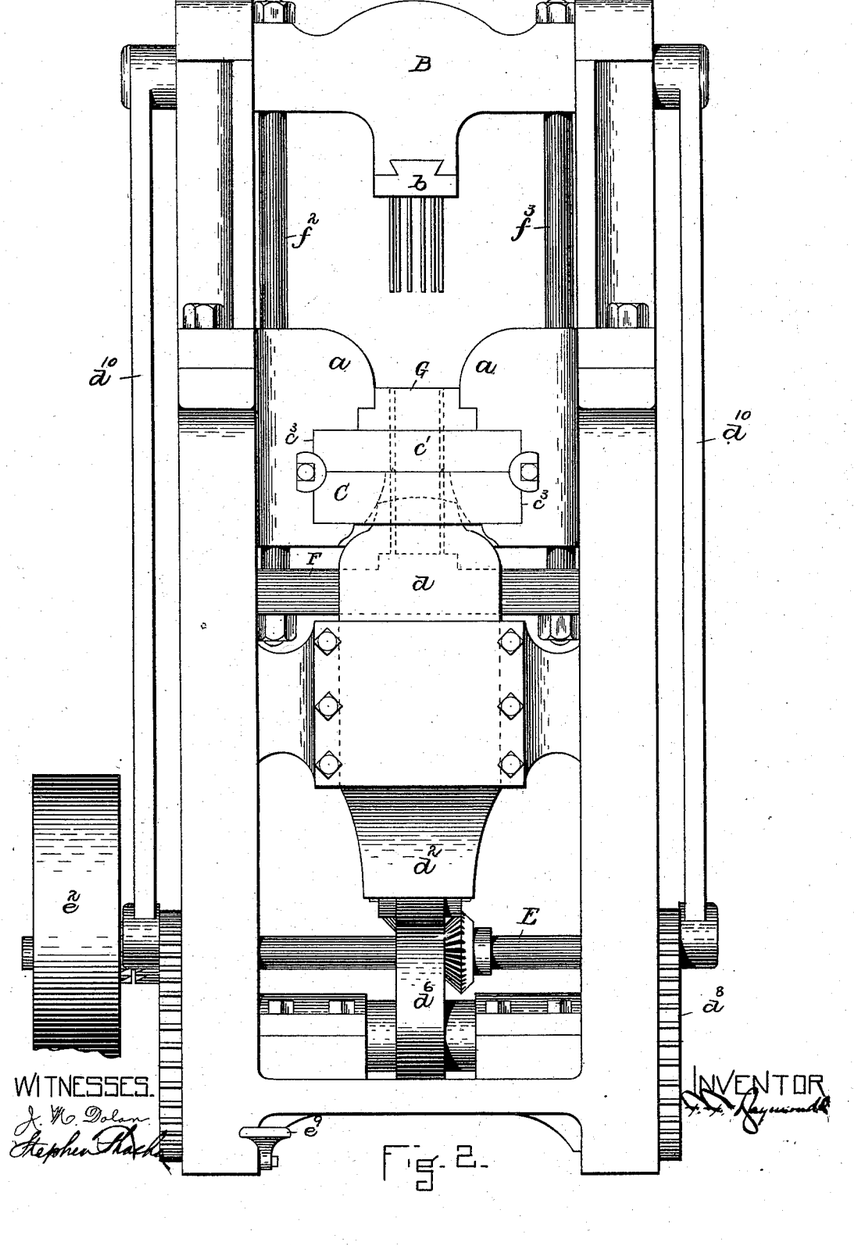
Fig. 2 is a view in front elevation thereof.
Figure 5:
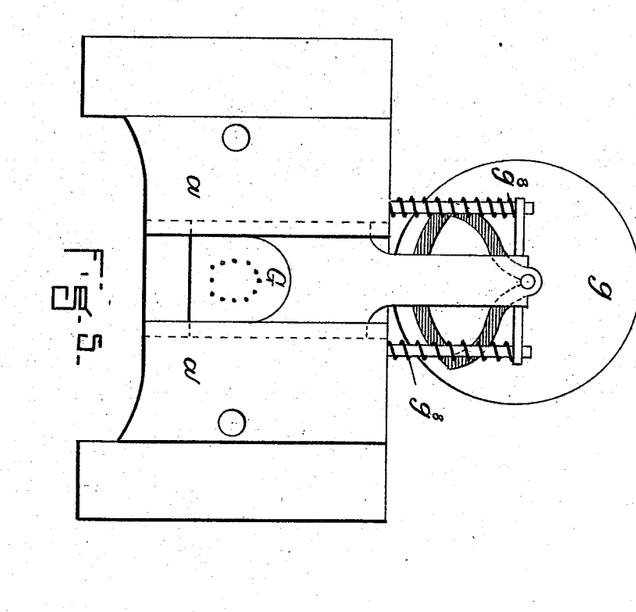
Fig. 5 is a detail view in plan to illustrate the mechanism for moving the nail-carrier plate into position by a cam and out of position by springs.

In the construction represented in Figs. 1, 2, and 5 the springs serving to throw out or withdraw the nail-carrier plate immediately after the drivers have lifted from its holes independently of its operative cam, so that it can be quickly removed from its operative position over the templet to its position to receive its load of nails, and in a time quicker than it can be moved by the cam. This is necessary, because in the operation of the machine it is essential that it be stopped immediately after the ends of the drivers have cleared the holes of the nail-carrier, and immediately upon said clearing of the drivers the nail-carrier must be quickly moved back to the position to receive its nails.

In Fig. 9 the nail-plate-withdrawing spring is represented bearing against the lever G'. Of course the nail-carrier could be moved into and out of operative position by hand, but I prefer to move it automatically.

Figure 10:
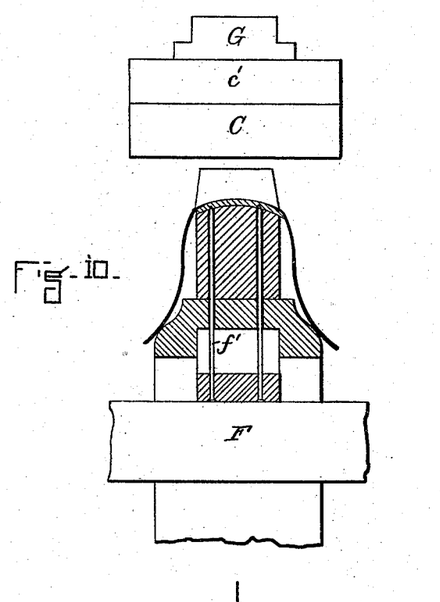
Fig. 10 is a detail view to illustrate the application of the mechanism in attaching heel-blanks to the soles of boots and shoes.
Figure 11:
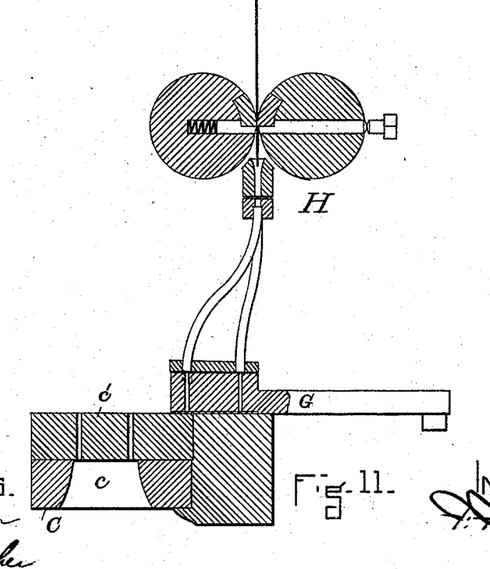
Fig. 11 is a detail view illustrating the relation of the automatic nail-feeding device to the nail-carrier templet and heel-mold.

In Fig. 10, I have represented, in lieu of the former D, a last or work-support for a boot or shoe mounted to be operated by the pressure-head.

The operation of the machine is as follows: The stop-motion is adjusted to stop the machine upon its upward movement when the ends of the drivers have cleared the upper surface of the nail-carrier plate G. The cam $d^6$ then immediately moves the former or last or work-support rapidly upward into the cavity of the solid die, if one be used, and against the under surface of the templet-plate and holds it in such position. Meanwhile the cross-head $B^6$ is moving upward, thereby causing the lower cross-head F and the gang of awls $f'$ to be moved upward also. The former or last or work-support comes to rest before the cross-head B reaches its highest position, and this causes the awls to be driven from the surface of the former upward through the compressed or compressed and molded heel or through the soles and heel to any extent required. As a rule, I prefer to drive them through the heel sufficiently to cause their ends or points to project or extend into the holes $c^2$ of the templet. The cross-head B then moves downward, moving the lower cross-head F and the awls $f'$ downward in relation to the heel and in relation to the last or work-support or former, the last or work-support or former still remaining in position to hold the heel in the mold, if one be used, and against the under surface of the templet. The nail-carrier G, having its holes filled with nails either by hand or by automatic feeding devices H, is moved into position over the templet with its holes in register with the holes $c^2$ during the upward and downward movement of the cross-head B, and the drivers $b'$ enter the holes of the nail-carrier and force the nails therefrom through the holes $c^2$ into the holes in the heel-blank formed by the awls, the nails and drivers following the downward movement of the awls, and the nails being driven into the heel-blank sufficiently to attach it to the soles of a boot or shoe, if one be used, or into the heel-blank only, leaving the ends of the nails extending from the tread surface thereof. Immediately upon the driving of the nails, the heel-former or last or work-support is permitted to move downward by the cam $d^6$, thereby permitting the cross-head B, by employment of drivers $b'$ of sufficient length and its continued descent, to force the heel-blank from the die and the portion of the nails which remain in the holes $c^2$ of the templet from the holes. Of course this ejecting movement of the drivers is only necessary where the organization is used for making a loaded heel-blank or a loaded molded heel-blank. The cross-head B then lifts slightly sufficient to bring the ends of its drivers above the nail-carrier plate G and permit the nail-carrier plate to be moved backward or into position to be loaded.

The position which the parts bear to each other upon the starting of the machine—that is, after the heel has been placed in position upon the former—is represented in Fig. 4. The position which they bear to each other at the end of the compressing or molding action upon the heel—that is, after the heel has been lifted upward by the former into the solid die and is compressed, and also after the awls have been moved upward to the heels in the former and into the heel-blank—is represented in Fig. 2.

Figure 6:
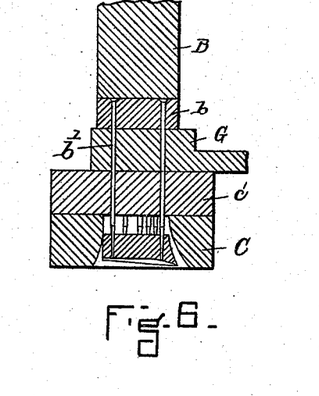
Fig. 6 is a detail view in section to illustrate the use of the drivers in ejecting the molded heel-blank from the mold.
Figure 7:
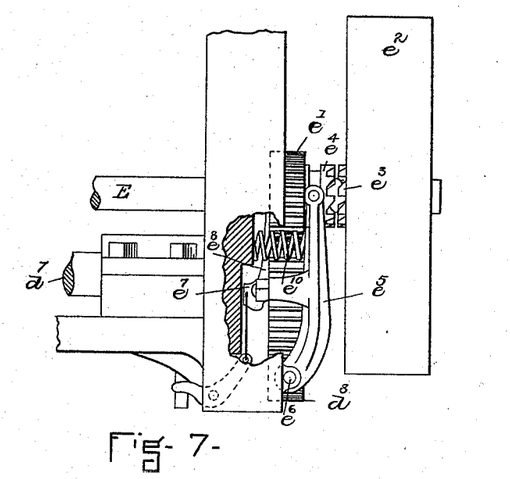
Figs. 7 and 8 are detail views illustrating the stop-motion mechanism.
Figure 8:
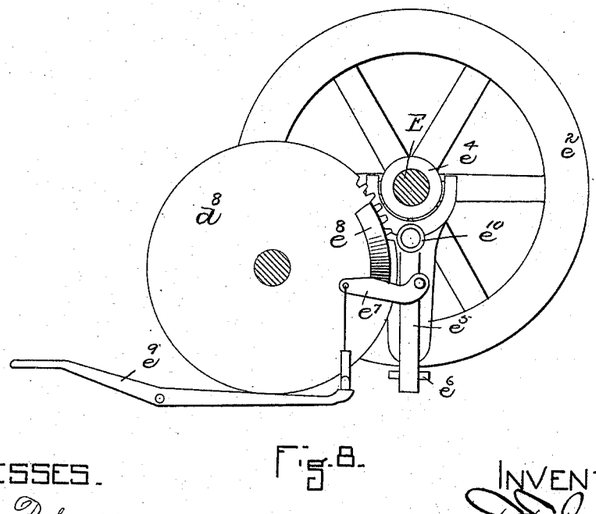

The relation which the parts bear to each other after the compression and pricking of the heel-blank and during the driving into the heel-blank of the nails from the nail-carrier is represented in Fig. 3. And the further action of the drivers in disengaging the compressed molded and loaded heel-blank from the mold is represented in Fig. 6.

Having thus fully described my invention, I claim and desire to secure by Letters Patent of the United States—

1. The combination in a heel-nailing machine of a templet having holes $c^2$, a former or work-support having holes $d'$ which register with the holes $c^2$, and a gang of awls movable in the holes of the former or work-support, the parts being provided with mechanism for moving them in relation to each other whereby the heel is caused to be compressed between the former or work-support and the templet and while held compressed pricked by the movement of awls from the former or work-support toward the seat-surface of the heel, as and for the purposes described.

2. The combination in a heel-nailing machine of the templet $c'$ having the holes $c^2$, the former or work-support having perforations $d'$, the reciprocating gang of awls $f'$ movable in the holes $d'$ of the former or work-support as specified, and a head carrying a gang or group of drivers $b'$ to work through the holes $c^2$ of the templet whereby the heel-blank is compressed against the templet, the awls caused to enter the same from the heel seat-surface to prick it, and the nails driven into the pricked holes from the tread-surface of the heel, substantially as described.

3. The combination in a heel-nailing machine of the templet having the holes $c^2$, the die C, the former or work-support D having the holes $d'$, the gang $f'$ of awls operated through the holes of the former or work-support, and the gang $b'$ of drivers operated through the holes of the templet, as and for the purposes described.

4. In a heel-nailing machine in combination with a templet having holes $c^2$ a side-molding die C, a perforated pressure-head or work-support to move the heel-blank against the templet and to mold it in conjunction with a die, a gang of awls movable through the former or work-support to prick the heel from its seat-surface, a nail-carrier to feed nails to the holes of the templet, and a gang of drivers to drive the nails through said templet-holes into the heel-blank while held by the former or work-support, as and for the purposes described.

5. The combination of a templet having the holes $c^2$, a perforated former or work-support, an upper reciprocating cross-head, a gang of drivers supported or carried thereby to enter the holes $c^2$ of the templet, a lower reciprocating cross-head carrying a gang of awls operating through the perforations of the former or work-support and connected with the upper cross-head whereby upon the movement of the heads in one direction the awls are caused to enter the heel and upon the movement of the cross-heads in the opposite direction the drivers are moved toward the heel to drive nails into the holes previously pricked by the awls, substantially as described.

6. The combination of the templet having holes $c^2$, a perforated former or work-support, a cam for moving and holding the same in operative relation to the templet, a lower cross-head carrying a gang of awls operating through the perforations of the former or work-support, an upper cross-head carrying a gang of drivers operating through the holes of the templet and connected with the lower cross-head, as and for the purposes described.

7. The combination of the templet having holes $c^2$, the die C having the die-cavity $c$, a perforated former or work-support a cam for moving and holding the same in operative relation to the templet, a lower cross-head carrying a gang of awls operating through the perforations of the former or work-support, an upper cross-head carrying a gang of drivers operating through the holes of the templet and connected with the lower cross-head, as and for the purposes described.

8. The combination of the cross-head B, the shaft $d^7$, the cranks $d^8$ $d^9$, connecting-rods connecting the crank-pins with the cross-head B, the pressure-cam $d^6$ carried by said shaft $d^7$, a pressure-head operated by said cam, a former or work-support mounted upon said pressure-head, a templet having the holes $c^2$, a lower cross-head having a gang of awls which work through the perforations of the former or work-support connected with the upper cross-head to be reciprocated thereby, and a gang of drivers carried by the upper cross-head to operate through the holes of the templet, substantially as described.

9. The combination of the cross-head B, the shaft $d^7$, the cranks $d^8$ $d^9$, connecting-rods connecting the crank-pins with the cross-head B, the pressure-cam $d^6$ carried by said shaft $d^7$, a pressure-head operated by said cam, a former or work-support mounted upon said pressure-head, a templet having the holes $c^2$, a lower cross-head having a gang of awls which work through the perforations of the former or work-support connected with the upper cross-head to be reciprocated thereby, a gang of drivers carried by the upper cross-head to operate through the holes of the templet, and a die C having the cavity $c$, substantially as described.

10. The combination of the cross-head B, the shaft $d^7$, the cranks $d^8$ $d^9$, connecting-rods connecting the crank-pins with the cross-head B, the pressure-cam $d^6$ carried by said shaft $d^7$, a pressure-head operated by said cam, a former or work-support mounted upon said pressure-head, a templet having the holes $c^2$, a lower cross-head having a gang of awls which work through the perforations of the former or work-support connected with the upper cross-head to be reciprocated thereby, a gang of drivers carried by the upper cross-head to operate through the holes of the templet, and a nail-carrier G, substantially as described.

11. The combination of the cross-head B, the shaft $d^7$, the cranks $d^8$ $d^9$, connecting-rods connecting the crank-pins with the cross-head B, the pressure-cam $d^6$ carried by said shaft $d^7$, a pressure-head operated by said cam, a former or work-support mounted upon said pressure-head, a templet having the holes $c^2$, a lower cross-head having a gang of awls which work through the perforations of the former or work-support connected with the upper cross-head to be reciprocated thereby, a gang of drivers carried by the upper cross-head to operate through the holes of the templet, a die C having the cavity $c$, and a nail-carrier G, substantially as described.

12. The combination of two perforated templets between which the heel-blank is compressed and held, a gang of awls operating through one of said templets, a gang of drivers operated through the other of said templets, the slide-block or cross-head for supporting the awls, a slide-block or cross-head for supporting the drivers, and connected with each other, the means for reciprocating the cross-heads and for moving one templet in relation to the other, and a start-and-stop motion to actuate the cross-heads to be first moved to cause the awls to operate and to be withdrawn, and the drivers to be then operated, as and for the purposes described.

FREEBORN F. RAYMOND 2D.

Witnesses:
   J. M. DOLAN,
   STEPHEN THACHER.